No. 736,921. Patented August 25, 1903.

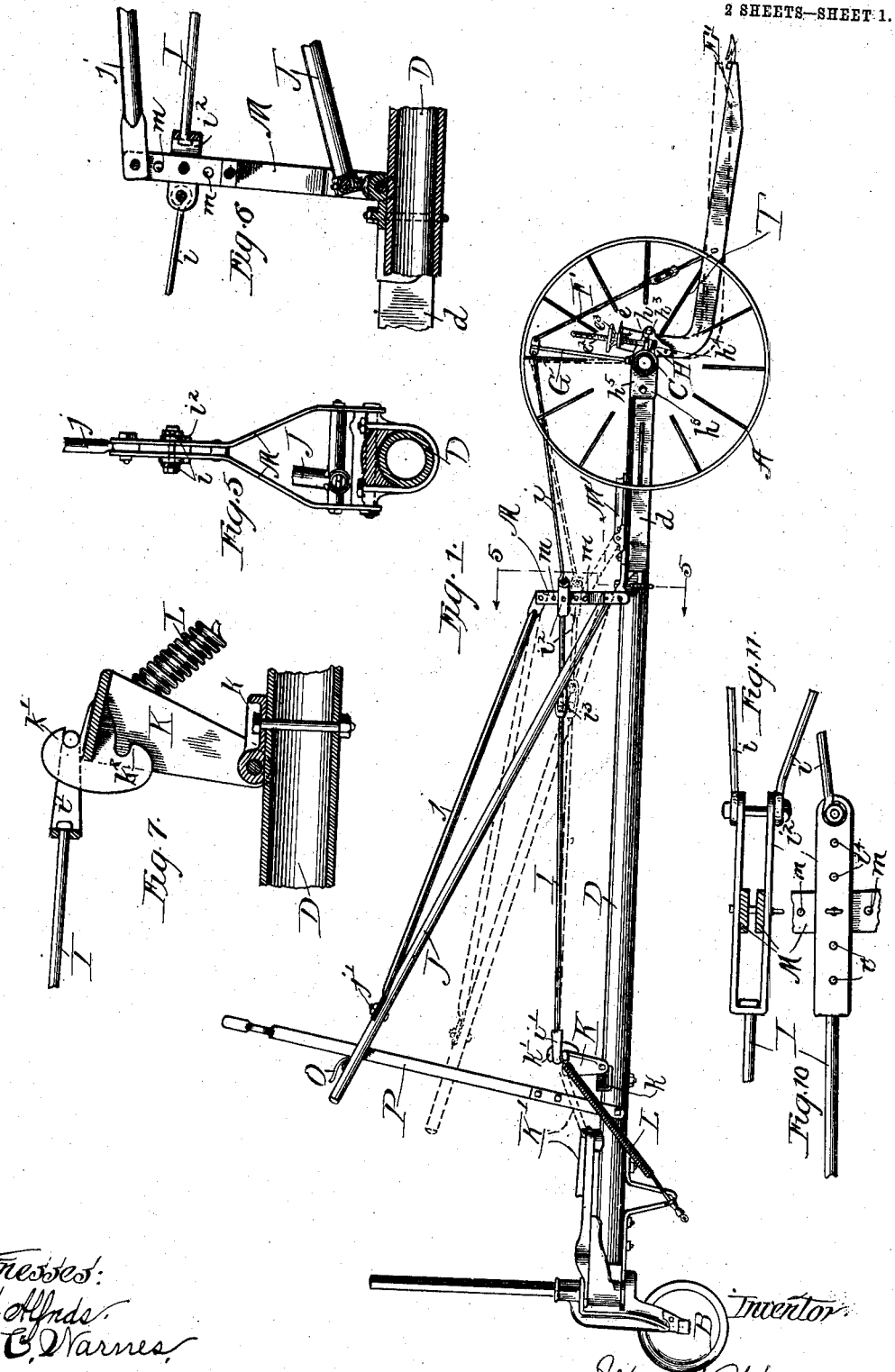

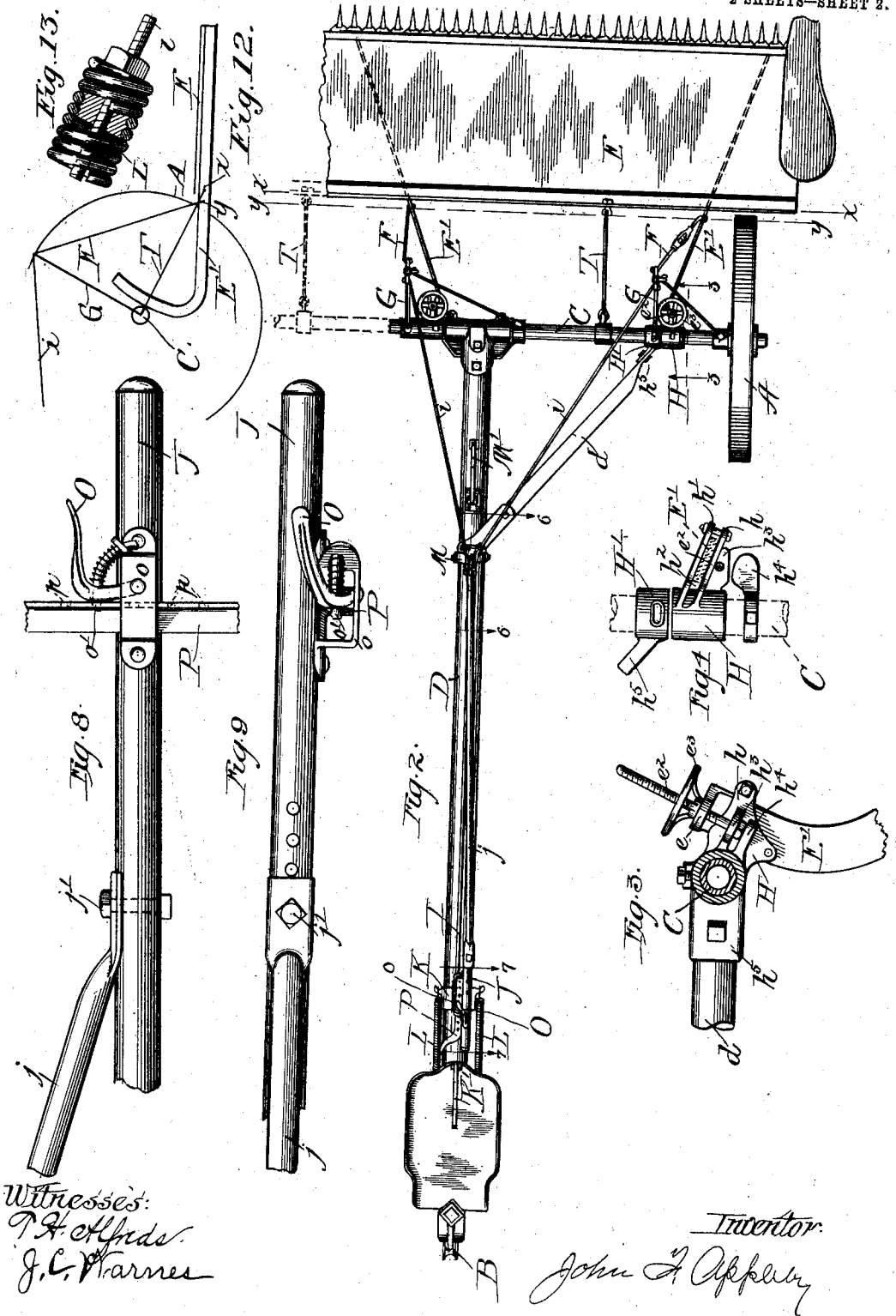

UNITED STATES PATENT OFFICE.

JOHN F. APPLEBY, OF CHICAGO, ILLINOIS, ASSIGNOR TO INTERNATIONAL HARVESTER COMPANY, A CORPORATION OF NEW JERSEY.

HARVESTING-MACHINE.

SPECIFICATION forming part of Letters Patent No. 736,921, dated August 25, 1903.

Application filed March 18, 1903. Serial No. 148,356. (No model.)

*To all whom it may concern:*

Be it known that I, JOHN F. APPLEBY, a citizen of the United States, residing at Chicago, in the county of Cook and State of Illinois, have invented a new and useful Improvement in Harvesting-Machines, of which the following is a complete specification.

This invention applies to harvesting-machines of the header type, in which the grain-receiving platform is adjustably sustained in a position in advance of the main supporting-frame of the machine. Its object is to provide simple and efficient means for effecting the adjustment of the said grain-receiving platform.

Briefly stated, the invention consists in an improved construction of the sustaining and adjusting means for the grain-receiving platform in machines of this class. The means by which this method of sustaining and adjusting is accomplished is shown in the following drawings, in which—

Figure 1 represents a side elevation of a portion of a harvester of the header type, the parts shown being sufficient to illustrate the application of my improvement. Fig. 2 is a plan view of the same. Fig. 3 is a section on the line 3 3 of Fig. 2, showing the means by which the platform is leveled. Fig. 4 is a plan view of the parts shown in Fig. 3. Fig. 5 is a vertical section on the line 5 5 of Fig. 1, showing the rocking standard which constitutes one of the three members forming the adjusting-lever. Fig. 6 is a side elevation, partly in section, showing the same member with fragments of the arms and pull-rod connected thereto. Fig. 7 shows a longitudinal vertical section through the spring-yoke, the casting to which it is pivotally secured, and a portion of the tongue-pipe contiguous thereto, the pull-rod and spring being shown connected to the upper end of said yoke. Fig. 8 is an elevation of the free end of the lifting-lever. Fig. 9 is a plan view of same. Figs. 10 and 11 represent an elevation and a plan, respectively, of a modified form of the clevis connecting the vertical member of the adjusting-lever with the pull-rod; and Fig. 12 is a diagrammatic view illustrating the two axes of the grain-receiving platform about which it is caused to move in its adjustment. Fig. 13 is a detail view showing the spring and plug therein by means of which the threaded bolt is secured to said spring.

In the drawings, A is the grain-wheel of a header, and B the usual tiller-wheel.

C is the main axle, and D the tongue-pipe.

E represents the grain-receiving platform, and E' the platform-supporting bars, vertically adjustable and pivotally connected to the said main axle C. By the rods F, which sustain the supporting-bars E' and the grain-receiving platform thereon, the forward end of said platform is raised and lowered, and as it is usually desirable to have the canvas conveyer on this platform operate in a plane substantially horizontal it becomes necessary to level the platform after adjusting it to any predetermined height. This leveling is effected by the means shown in Fig. 1 and in detail in Figs. 3 and 4, in which $e$ represents a shoulder formed on the end of the supporting-bar E' and at right angles to the length of said bar.

H is a casting sleeved on the main axle. On this casting H, extending forwardly and obliquely in a direction corresponding with that of the supporting-bars E', are the vertically-disposed parallel flanges $h$ and $h'$, forming the slot $h^2$. In this slot fit the upturned ends of the said supporting-bars. The upturned ends of the said supporting-bars conform on their rear or engaging edges to the arc of a circle the center of which lies in a line coincident with the line traversing the points of attachment of the said grain-receiving platform to the tie-rods T, which extend to and connect with the main axle of the machine. On the outside of the flange $h$ is a shoulder $h^3$, provided with an aperture somewhat larger than the long threaded bolt $e^2$, which passes therethrough and extends upwardly and engages an aperture in the laterally-projecting shoulder $e$ of the supporting-bars E'.

H' is a collar secured to the main axle C adjacent to the inner end of the casting H, and integral with this collar H' is the lug $h^5$, to which is secured the brace $d$, which extends to and connects with the tongue-pipe D.

Since the supporting-rods F are secured to the grain-receiving platform rearward of its center of gravity, the tendency of the rear end of the bars E' will be to move upward. The hand-wheel $e^3$ on the bolt $e^2$ prevents this upward movement and enables the platform to be leveled when tilted to the desired height. When the platform is tilted up or down with the adjusting-lever hereinafter described, its axis of movement will be the main axle of the machine; but when the rear end thereof is raised or lowered by means of the leveling device the axis of movement will be on the line of attachment of said platform to the tie-rods T, extending to the main axle, as previously described. This line of attachment is designated by the letter $x$ in Fig. 12 and by the line $x\ x$ in Fig. 2. Theoretically the point of attachment of the supporting-rods F to the supporting-bars E' (represented by the letter $y$ in Fig. 12 and by the line $y\ y$ in Fig. 2) should be on a line coincident with the said axis of movement $x\ x$ of the platform E. The theoretical location has been slightly departed from in manufacturing, as shown in Fig. 12, but to such a slight extent, however, as to avoid adversely affecting the proper movement of the various parts. The lug $h^4$ serves to hold in position the bolt $e^2$ and the hand-wheel $e^3$ thereon. This lug $h^4$ is formed integral with a collar which sleeves on the main axle C adjacent to said casting H, the said lug projecting longitudinally from the face of the collar and the collar itself being secured to the main axle by a set-screw or other suitable means when the said lug $h^4$ is brought to its position beneath the bolt $e^2$, as shown in Fig. 4.

The supporting-rods F are secured at their upper ends to the struts G, and these struts are received by sockets in the casting H'. The upper ends of these struts and the supporting-rods F in connection therewith are controlled by the branches $i\ i$ of the pull-rod I. To the rear end of this pull-rod is secured the clevis $i'$, which engages with the spring-yoke K. This spring-yoke is pivotally secured to the casting $k$, which in turn is secured to the tongue-pipe D. To counteract the stress in the pull-rod I, springs L are interposed between the free end of the yoke and a fixed part of the frame, as shown in Figs. 1, 2, and 7. The attachment of the clevis $i'$ to the yoke K is accomplished by means of two hooks $k'$ and $k^2$, integral with and on the free end of the said yoke, the hooks $k'$ and $k^2$ being at different distances from the fulcrum of the yoke. The springs L operate through the yoke K, the pull-rod I and its branches $i$, the struts G, and the supporting-rods F to counterbalance the grain-receiving platform. The tension of said springs may be adjusted to suit the weight of said platform by the threaded bolts $l$, which screw in a plug in the end of the springs. In order to readily control and adjust the platform in its various positions, a lever is fulcrumed on the tongue-pipe D and by preference connected to the pull-rod I. It is not essential to the successful application of this invention, however, that the platform-adjusting lever operate upon the platform through the counterbalancing-spring and pull-rod, for the same result would be obtained should the operation of the adjusting-lever and counterbalancing device act independent of each other. This lever comprises a standard M, pivotally mounted on the said tongue-pipe and provided with a series of apertures $m$ near the upper end thereof. This standard is engaged by a clevis $i^2$, which is secured to the pull-rod I. This clevis $i^2$ is also provided with an aperture, which can be brought to register with any one of the series of holes $m$. At a position near the pivotal point and also at a position near the free end of said standard M are secured the arms J and $j$, respectively. These arms extend rearwardly and converge, the ends being secured by a bolt $j'$, thus forming a rigid triangle. A series of apertures is provided in the arm J for the bolt $j'$, as shown in Fig. 9. To sustain the arm J and its connected parts in any fixed position, a thumb-latch O is provided, which pivots on the bracket $o$, which in turn is secured to said arm J, as shown in Figs. 8 and 9. This bracket $o$ loosely guides an arm P, preferably of angle-iron, the lower end of which is pivotally secured to the tongue-pipe D. The thumb-latch O is spring-held in contact with the said arm P, and a projection $o'$ thereon engages one of a series of holes $p$ which is provided in said arm, the said holes being indicated by dotted lines in Fig. 8.

The pull-rod I is provided with a turnbuckle $i^3$ for adjusting the length of said rod.

K' is an arm pivoted, preferably, to lugs integral with the casting forming the operator's stand, its free end adapted to engage the spring-yoke K and prevent said yoke from yielding to the retractive force of the spring L when the opposing force exerted by the pull-rod I is withdrawn. M' is a similar arm operating to lock the standard M against forward movement caused by the weight of the grain-receiving platform acting through the rods F and $i$. The function and operation of these lock-arms K' and M' and the triangular lever already described will be more fully set forth in the description of their manipulation, which is as follows: The operator having determined at what height he desires to cut the grain, he tilts the platform by means of the adjusting-lever to that position, the center of movement of said platform in this adjustment being about the main axle C. If found necessary, the platform is then leveled by the hand-wheel $e^3$ and its coacting parts, with the center of movement being about the line $x\ x$, traversing the point of attachment of the platform to the tie-rods, as already described. The first-mentioned adjustment of the platform may have brought the arm J of the adjusting-lever to occupy a position in which its range of movement from the normal is not within convenient reach of the operator, as indicated in full lines in Fig. 1, or if for any other reason it is found desirable to change the range of movement of said lever the bolt $j'$ is removed and the arm J lowered the required amount, or to the position indicated by dotted lines in Fig. 1, when the bolt $j'$ is again inserted in the arm $j$ and in the particular hole of the series which registers therewith. By changing the range of movement of a lever is to be understood to mean the changing from the position the lever ordinarily occupies when the mechanism it controls is in its normal working position to a position of the lever removed from its original position, the location of the parts controlled by said lever be unaffected by this change. By changing the scope of movement of a lever or its affected parts is to be understood to mean an increase or decrease of the latitude of movement of that part. It is evident that a variation in the range of movement of the adjusting-lever could be obtained should the clevis $i^2$ be made longer and provided with a series of holes $i^4$, as shown in Figs. 10 and 11, the said holes adapted to engage any one of the series of holes in the standard M. In this modified form of the clevis $i^2$ the change in the range of the lever would be accomplished by withdrawing the pin securing said clevis to the standard M, moving the said lever to the desired position, and again connecting the clevis and standard. If it is desired to increase the scope or extent of movement of the platform without a corresponding increase in the movement of the adjusting-lever, the clevis $i^2$ is connected by its pin to one of the series of holes $m$ farther from the fulcrum of the standard M, and, conversely, if it is desired to increase the effective pull of the lever with a corresponding decrease in the scope or extent of movement of the adjusted platform the clevis $i^2$ is secured nearer the fulcrum of the standard, as indicated by dotted lines in Fig. 1. Wherever the clevis $i^2$ may be located relative to the fulcrum-point of said standard M the lifting or counterpoising effect of the spring L will remain substantially the same. If it is desired to increase the reactionary force of the spring L, it is accomplished by moving the clevis $i'$ nearer the pivotal point of the spring-yoke K, or from the hook $k'$ to the hook $k^2$, as shown in Fig. 7. To accomplish this the lock-arm K' is swung in position to intercept the rearward movement of the spring-yoke K, as indicated by dotted lines in Fig. 1, and the lock-arm M' is swung in position to prevent further movement of the standard M, also indicated by dotted lines in the same figure. With the yoke K and the standard M thus locked the turnbuckle $i^3$ may be turned to extend the pull-rod I and enable the clevis $i'$ to be placed from the upper to the lower hook on the yoke K, or vice versa. The turnbuckle is then rotated in a direction to contract the pull-rod I and remove the stress from the lock-arms K' and M', which are then thrown back to a non-engaging position.

What I claim as my invention, and desire to secure by Letters Patent, is—

1. In a grain-harvesting machine, a supporting-axle forming an axis of movement for the grain-receiving platform when vertical adjustment thereof is made, a main frame mounted upon said supporting-axle, a grain-receiving platform, the rear end thereof being supported by and having vertically-adjustable connection with the said main supporting-axle, means interposed between a fixed portion of the said main frame and the grain-receiving platform for supporting the forward end thereof, the said supporting means pivotally connecting with said platform, the said pivotal connection constituting an axis of movement for the platform when the leveling thereof is effected, means adjacent to said main axle for effecting such leveling, and a device for effecting the vertical adjustment of said platform about the main axle, all combined substantially as described.

2. In a grain-harvesting machine, a main supporting-axle forming an axis of movement when vertical adjustment of the platform is made, a main frame mounted thereon, platform-supporting bars pivotally connected to said main axle and vertically adjustable relative thereto, a grain-receiving platform rigidly secured to said supporting-bars, supporting-rods extending from the main frame to the supporting-bars with which they form a pivotal connection at a point intermediate of the length of the latter, the said pivotal connection constituting an axis of movement for said platform when adjustment thereof for leveling is made, and means for effecting the adjustment of the said grain-receiving platform on both of its axes of movement, all combined substantially as described.

3. In a grain-harvesting machine, a main frame, a main supporting-axle, platform-supporting bars having their rear ends upwardly inclined, supporting-rods extending from said supporting-bars to the frame of said machine, a grain-receiving platform rigidly mounted upon said supporting-bars, thus being in effect as one piece therewith, and having two pivotal axes of support, means interposed between the rearwardly-upturned ends of said supporting-bars and the supporting-axle for leveling the grain-receiving platform, a spring and pull-rod for counterbalancing said platform, and a platform-adjusting lever variable in its range of movement and adjustably connected to said supporting-rods, all combined substantially as described.

4. In a grain-harvesting machine, a main frame, a supporting-axle, supporting-bars, a grain-receiving platform rigidly mounted upon said supporting-bars, and thus formed as one piece therewith, and having two pivotal axes of support, said pivotal axes constituting centers of movement of said platform when adjustment thereof is effected, means interposed between said supporting-bars and supporting-axle for leveling the grain-receiving platform, a spring and pull-rod for counterbalancing said platform, and a platform-adjusting lever, variable in its range of movement, operating in conjunction with said pull-rod and releasably and adjustably connected therewith, all combined substantially as described.

5. In a grain-harvesting machine, a supporting-axle, a main frame mounted thereon, a grain-receiving platform having a pivotal axis of support coincident with the supporting-axle of the main frame and another pivotal axis of support located forwardly therefrom, a counterbalancing-spring and pull-rod, a platform-adjusting lever fulcrumed on the said main frame and comprising a vertical member pivotally connected to the main frame and releasably and adjustably connected to said pull-rod, and two rearwardly-extending converging members connected at their free ends, thereby adapting said lever to move within a path of predetermined limits whatever variation may be required in the height of said grain-receiving platform, and means adjacent to said supporting-axle for leveling said platform, all combined substantially as described.

6. In a grain-harvesting machine, a main frame, a grain-receiving platform having two pivotal axes of support upon said main frame, a spring and pull-rod for sustaining and counterbalancing said platform, pivoted members to which said pull-rod is connected, means for adjusting the effective pull of said spring upon said pull-rod, and means for locking against movement the members supporting the pull-rod when said adjustment is made, all combined substantially as described.

7. In a grain-harvesting machine, in combination a main frame, a grain-receiving platform, supporting-bars thereunder, said supporting-bars having the rear ends thereof upwardly inclined, means for pivotally adjusting the upwardly-inclined ends of said bars to the axle of the main frame, said means comprising castings sleeved upon said axle, parallel vertically-disposed flanges integral with said casting, said flanges forming slots adapted to receive the upwardly-inclined ends of said supporting-bars, a threaded bolt sustained by said casting, said bolt engaging a laterally-projecting lug upon said upwardly-inclined ends of the supporting-bars, and a hand-wheel on said bolt for controlling the vertical position of the rear ends of the said supporting-bars, and spring-held supporting and adjusting rods interposed between said grain-receiving platform and a fixed portion of the main frame, substantially as described.

JOHN F. APPLEBY.

In presence of—
  J. C. WARNES,
  T. H. ALFREDS.